United States Patent
Prichard et al.

[11] Patent Number: 6,129,608
[45] Date of Patent: Oct. 10, 2000

[54] CANDY DISPENSING CHARACTER

[75] Inventors: Tom Prichard, Fairfield, Calif.; Tsui Ching Man; Ng Kwok Leung, both of Hong Kong, The Hong Kong Special Administrative Region of the People's Republic of China

[73] Assignee: Oddzon, Inc., Pawtucket, R.I.

[21] Appl. No.: 09/330,623

[22] Filed: Jun. 11, 1999

[51] Int. Cl.⁷ .................................................. A63H 33/30
[52] U.S. Cl. ...................... 446/475; 446/487; 221/186; 221/188
[58] Field of Search ................... 446/71, 72, 73, 446/75, 268, 365, 475, 487; 222/78, 164, 463; 221/185, 186, 188, 247, 248, 24, 190

[56] References Cited

U.S. PATENT DOCUMENTS

| | | |
|---|---|---|
| 790,111 | 5/1905 | Crossley . |
| 1,225,143 | 5/1917 | Kulick ....................................... 221/188 |
| 1,569,637 | 1/1926 | Snyder ....................................... 221/186 |
| 1,725,965 | 8/1929 | Ormiston . |
| 2,514,450 | 7/1950 | Kopf ........................................... 221/24 |
| 5,356,035 | 10/1994 | Shlopak et al. ............................. 222/78 |
| 5,385,267 | 1/1995 | Diamond et al. ......................... 221/248 |
| 5,388,723 | 2/1995 | Kampmeyer ............................. 221/186 |
| 5,651,475 | 7/1997 | Fenton ....................................... 221/24 |
| 5,673,813 | 10/1997 | Russell ..................................... 221/203 |
| 5,976,006 | 11/1999 | Snyder ..................................... 221/186 |

OTHER PUBLICATIONS

Cap Candy brochure, p. 11, Candy Hander with M&M's Minis, Item#4750, prior art.

*Primary Examiner*—Sam Rimell
*Attorney, Agent, or Firm*—Marshall, O'Toole, Gerstein, Murray & Borun

[57] ABSTRACT

A candy dispensing character is provided with a candy dispensing body, a hollow candy reservoir disposed in the candy dispensing body and sized to hold a plurality of candy pieces, a movable candy dispensing bin attached to the candy dispensing body and being movable between a closed position and an open position in which a portion of the candy dispensing bin extends outwardly from the candy dispensing body so that a piece of candy may be removed from the candy dispensing bin. The candy dispensing character is also provided with a biasing mechanism that causes the candy dispensing bin to be biased towards the closed position and a support, such as a pair of legs, coupled to the candy dispensing body that is shaped so as to be capable of supporting the candy dispensing body in a standing position. The support is operatively coupled to the candy dispensing bin so that movement of the support relative to the candy dispensing body causes the candy dispensing bin to move from the closed position to the open position.

16 Claims, 2 Drawing Sheets

6,129,608

CANDY DISPENSING CHARACTER

BACKGROUND OF THE INVENTION

The present invention is directed to a candy dispensing character that dispenses pieces of candy.

Various candy dispensing mechanisms have been marketed in the past to provide entertaining ways of dispensing pieces of candy. For example, one prior art candy dispensing mechanism which was marketed more than one year before the filing of this patent was an M&M® candy dispensing character. That dispensing character had a M&M® candy shaped body, a pair of boots which were attached to a bottom portion of the body, a pair of movable hands and arms that extended outwardly from body, and a cylindrical candy container filled with M&M® candies which mounted onto the body in an inverted position.

In use, after the candy container with the M&M® candies was mounted onto the body in its inverted position, the position of the left hand of the prior art candy dispensing character was manipulated to cause an M&M® candy to be dispensed from the candy container into the right hand of the candy dispensing character. In particular, in response to a user pivoting the left hand, the right hand of the candy dispensing character would be drawn into the body, an M&M® candy would be deposited into the right hand, and then the right hand would move outwardly with the M&M® candy disposed therein.

SUMMARY OF THE INVENTION

The invention is directed to a candy dispensing character having a candy dispensing body, a hollow candy reservoir disposed in the candy dispensing body and sized to hold a plurality of candy pieces, and a movable candy dispensing bin attached to the candy dispensing body and being movable between a closed position and an open position in which a portion of the candy dispensing bin extends outwardly from the candy dispensing body so that a piece of candy may be removed from the candy dispensing bin.

The candy dispensing character is also provided with a biasing mechanism that causes the candy dispensing bin to be biased towards the closed position and a support, such as a pair of legs, coupled to the candy dispensing body that is shaped so as to be capable of supporting the candy dispensing body in a standing position. The support is operatively coupled to the candy dispensing bin so that movement of the support relative to the candy dispensing body causes the candy dispensing bin to move from the closed position to the open position.

The candy dispensing bin may be pivotable between a closed position in which an outer portion of the candy dispensing bin is substantially flush with an outer portion of the candy dispensing body and an open position in which a portion of the candy dispensing bin extends outwardly from the candy dispensing body so that a piece of candy may be removed from the candy dispensing bin. The biasing mechanism may be a spring that causes the candy dispensing bin to be spring-biased towards the closed position.

The candy dispensing character may be provided with a pair of legs that are linearly translatable relative to the candy dispensing body between a retracted position and an extended position so that, when the candy dispensing body is in the standing position and the candy dispensing body is pushed downwardly, the upper portions of the legs make contact with the bottom portion of the candy dispensing bin and force the candy dispensing bin from the closed position to the open position as the upper portions of the legs move from the extended position to the retracted position.

The features and advantages of the present invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

Figure 1:
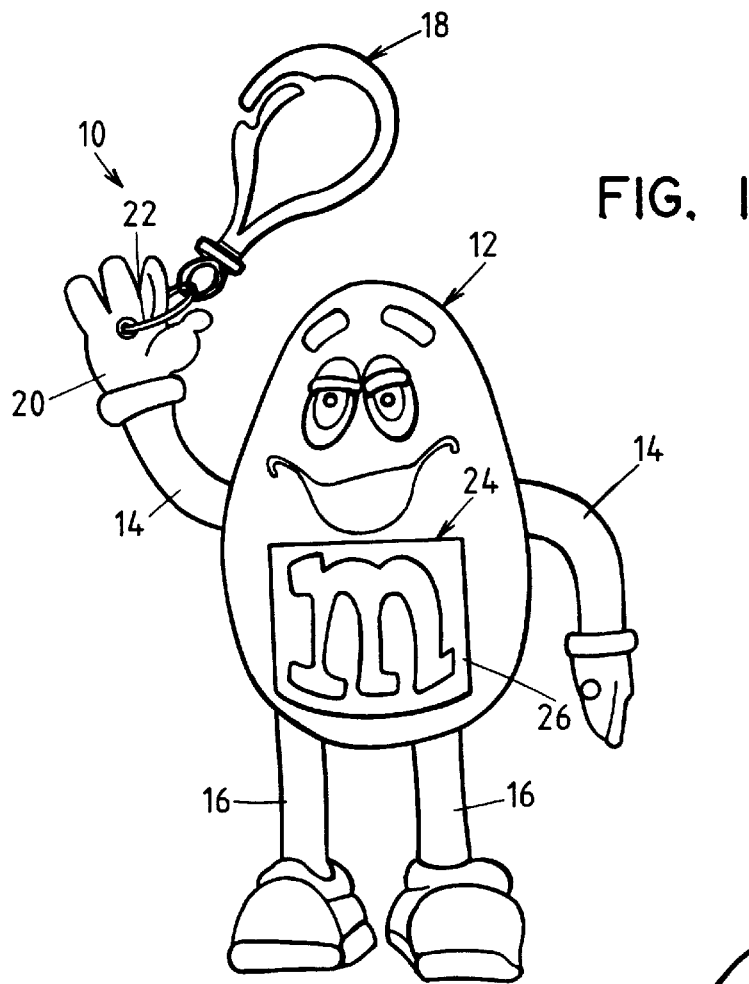
FIG. 1 illustrates an embodiment of a candy dispensing character in accordance with the invention.

FIG. 1 illustrates an embodiment of a candy dispensing character 10 in accordance with the invention. Referring to FIG. 1, the character 10 has a body 12 in the shape of an M&M® candy, a pair of arms 14 connected to the body 12, a pair of legs 16 connected to the body 12, and a plastic clip 18 attached to a hand 20 via a metal ring 22. The clip 18 may be used to attach the character 10 to other items, such as a belt loop on a pair of shorts, for example. The legs 16 act as a support and are capable of supporting the candy dispensing character 10 in a standing position, as shown in FIG. 1.

Figure 2:
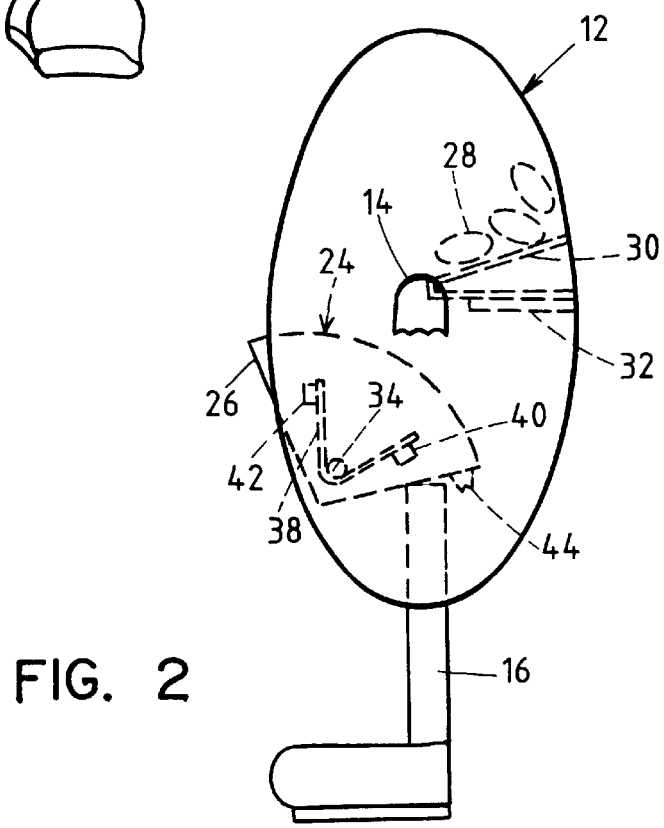
FIG. 2 is a side view of the candy dispensing character of FIG. 1.
Figure 4:
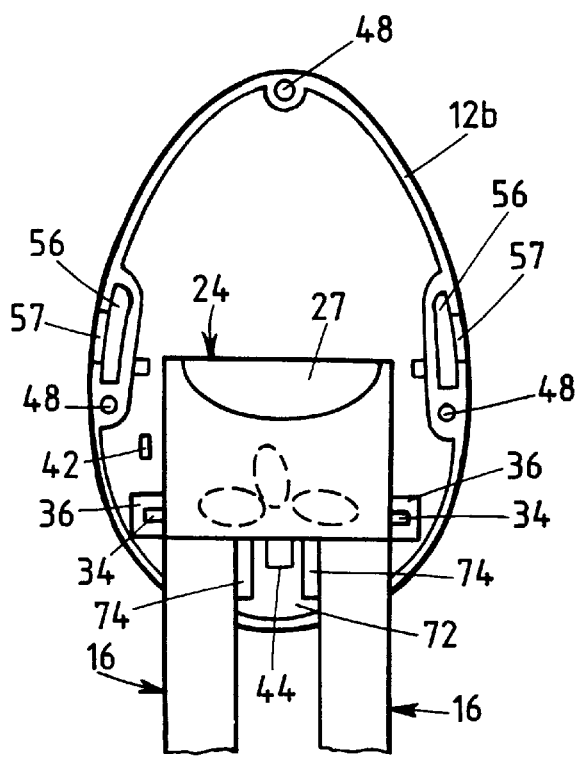
FIG. 4 is a side view of another portion of the candy dispensing character.

Referring to FIGS. 1 and 2, the interior of the body 12 of the candy dispensing character 10 is hollow and thus acts as a candy reservoir, and a plurality of candy pieces, such as M&Ms, are disposed therein. The body 12 of the character 10 has a candy bin 24 disposed therein. The candy bin 24 is movable between a closed position in which an outer curved, generally rectangular surface 26 of the candy bin 24 is flush with the curved outer surface of the body 12 and an open position in which the candy bin 24 extends outwardly from the body. As shown in FIG. 4, the upper portion of the candy bin 24 has an opening 27 formed therein. When the candy bin 24 is in the open position, one or more pieces of candy 28, such as M&M® candies, that are disposed therein may be removed by the user.

Figure 3:
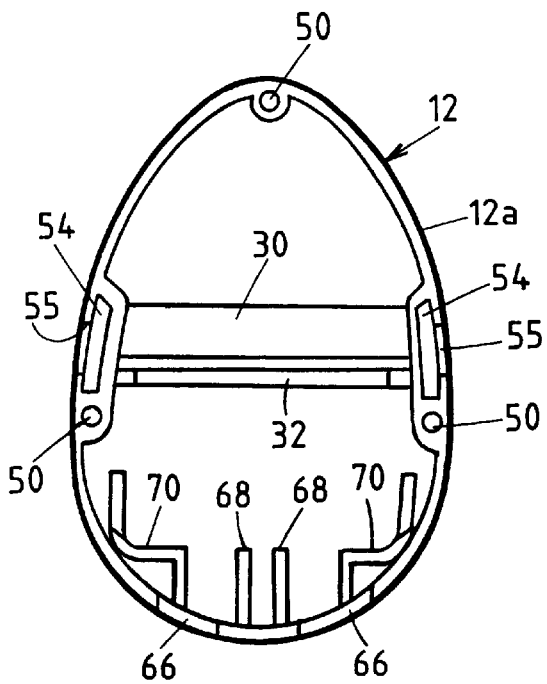
FIG. 3 is a side view of a portion of the body of the candy dispensing character.

As shown in FIG. 2, the body 12 of the candy dispensing character 10 has an internal candy shelf 30 disposed therein which is supported by a U-shaped shelf support 32 (see also FIG. 3). The candy bin 24 is pivotable about a pair of pivot pins 34, each of which is disposed on an opposite side of the candy bin 24 as shown in FIG. 4. Each pivot pin 34 is pivotably disposed within a respective pin receptacle 36 which may be integrally formed with the body 12.

Referring to FIG. 2, a spring 38 may be used to bias the candy bin 24 to its closed position. The spring 38 has a portion that is wrapped around one of the pivot pins 34, a first end that abuts a spring stop 40 integrally formed with the candy bin 24, and a second end that abuts a spring stop 42 integrally formed with the body 12 (the spring 38 and the spring stop 40 are not shown in FIG. 4 for sake of clarity). A tab 44 may be formed on the lower surface of the candy bin 24.

Referring to FIGS. 3 and 4, the body 12 of the candy dispensing character 10 may be formed of two generally hemispherical pieces 12a, 12b, which may be connected together in any manner, such as by mating a plurality of posts 48 integrally formed with the body piece 12b with a plurality of receptacles 50 formed in the body piece 12a.

Figure 5:
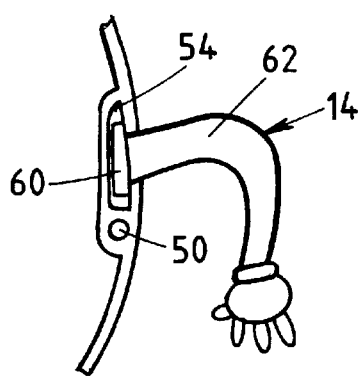
FIG. 5 is a side view of a portion of the candy dispensing character showing the attachment of an arm to the body of the character.

Referring to FIGS. 3–5, the body piece 12a has a pair of slots 54 and a pair of semi-circular apertures 55 formed therein, and the body piece 12b has a pair of slots 56 and semi-circular apertures 57 formed therein. Each pair of slots 54, 56 is designed to mate together in order to retain a flat cylindrical end 60 of each of the arms 14. When the body pieces 12a, 12b are mated together, the semi-circular apertures 57 are disposed adjacent the semi-circular apertures 55 to form circular apertures through which a portion 62 of each of the arms 14 extends. Since the cylindrical ends 60 of the arms 14 have a larger diameter than the circular holes formed by the apertures 55, 57, the arms 14 are retained between the body pieces 12a, 12b and may be rotated relative to the body 12.

Figure 6:
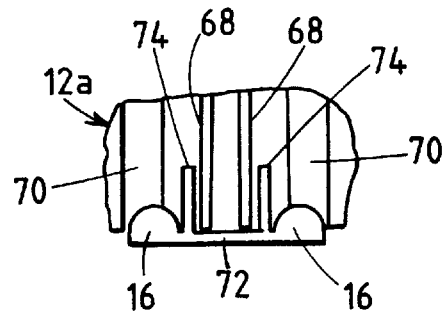
FIG. 6 is a top view of a portion of the candy dispensing character.

Referring to FIGS. 3, 4 and 6, each piece 12a, 12b of the body 12 of the candy dispensing character 10 has a pair of semi-circular apertures 66 which are shaped to receive the legs 16. The legs 16 are linearly translatable relative to the body 12. To control the linear translation of the legs 16, the body piece 12a may be provided with a pair of elongate leg guides 68, 70, and the legs 16 may be joined together at an upper leg junction 72 having a pair of leg guides 74. As shown in FIG. 6, which is a top view of a portion of the candy dispensing character 10, the leg guides 74 coupled to the legs 16 are guided by the leg guides 72 of the body piece 12a, and the legs 16 are further guided by a pair of curved ends of the leg guides 70 which generally conform to the curved surfaces of the legs 16.

Referring to FIGS. 1, 2 and 4, to dispense a piece of candy 28 from within the body 12, the candy dispensing character 10 may be shaken or tilted until at least one piece of candy 28 falls into the opening 27 in the candy bin 24 when the bin 24 is in its closed position. Then, the user may push down on the body 12 so that the legs 16 move into the interior of the body 12. Referring to FIG. 2, as the legs 16 move into the body 12, they make contact with the underside of the candy bin 24 (which is fixed to and moves with the body 12) and force the candy bin 24 to pivot so that the candy bin 24 moves from its closed position to its open position with the candy piece(s) 28 disposed therein.

The candy pieces 28 may be initially placed within the interior of the body 12 by a door (not shown) formed in an upper portion of the body. Alternatively, the candy pieces 28 may be placed within the body 12 upon manufacture and assembly of the candy dispensing character 10. The candy pieces 28 may also be inserted into the interior of the body 12 via the candy bin 24, by placing the candy pieces 28 in the bin 24 in the open position, allowing the bin 24 to close, and then with the bin 24 closed, tilting the body 12 so that the candy pieces 28 fall outside of the candy bin 24, and repeating that process.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A candy dispensing character, comprising:
   a candy dispensing body shaped like a piece of candy;
   a hollow candy reservoir disposed in said candy dispensing body, said hollow candy reservoir sized to hold a plurality of candy pieces;
   a pivotable candy dispensing bin attached to said candy dispensing body, said candy dispensing bin being pivotable between a closed position in which an outer portion of said candy dispensing bin is substantially flush with an outer portion of said candy dispensing body and an open position in which a portion of said candy dispensing bin extends outwardly from said candy dispensing body so that a piece of candy may be removed from said candy dispensing bin;
   a spring that causes said candy dispensing bin to be spring-biased towards said closed position;
   a pair of arms coupled to said dispensing body; and
   a pair of legs coupled to said candy dispensing body that are shaped so as to be capable of supporting said candy dispensing body in a standing position, an upper portion of each of said legs being positioned beneath said candy dispensing bin when said candy dispensing body is disposed in said standing position, said legs being linearly translatable relative to said candy dispensing body between a retracted position and an extended position so that, when said candy dispensing body is in said standing position and said candy dispensing body is pushed downwardly, said upper portions of said legs make contact with said bottom portion of said candy dispensing bin and force said candy dispensing bin from said closed position to said open position as said upper portions of said legs move from said extended position to said retracted position.

2. A candy dispensing character as defined in claim 1 wherein said legs are joined together at a leg junction disposed at an upper end of each of said legs.

3. A candy dispensing character as defined in claim 1 wherein each of said arms is movable relative to said candy dispensing body.

4. A candy dispensing character as defined in claim 1 wherein said candy dispensing body has a guide member shaped to guide said linear translation of said legs from said extended position to said retracted position.

5. A candy dispensing character, comprising:
   a candy dispensing body;
   a hollow candy reservoir disposed in said candy dispensing body, said hollow candy reservoir sized to hold a plurality of candy pieces;
   a movable candy dispensing bin attached to said candy dispensing body, said candy dispensing bin being movable between a closed position and an open position in which a portion of said candy dispensing bin extends outwardly from said candy dispensing body so that a piece of candy may be removed from said candy dispensing bin;
   a biasing mechanism that causes said candy dispensing bin to be biased towards said closed position; and
   a support coupled to said candy dispensing body that is shaped so as to be capable of supporting said candy dispensing body in a standing position, said support being operatively coupled to said candy dispensing bin so that movement of said support relative to said candy dispensing body causes said candy dispensing bin to move from said closed position to said open position.

6. A candy dispensing character as defined in claim 5 wherein said support comprises a pair of legs.

7. A candy dispensing character as defined in claim 5 wherein said support comprises a pair of legs and wherein said legs are linearly translatable relative to said candy dispensing body between a retracted position and an extended position.

8. A candy dispensing character, comprising:

a candy dispensing body;

a hollow candy reservoir disposed in said candy dispensing body, said hollow candy reservoir sized to hold a plurality of candy pieces;

a movable candy dispensing bin attached to said candy dispensing body, said candy dispensing bin being movable between a closed position and an open position in which a portion of said candy dispensing bin extends outwardly from said candy dispensing body so that a piece of candy may be removed from said candy dispensing bin, an outer portion of said candy dispensing bin being substantially flush with an outer portion of said candy dispensing body when said candy dispensing bin is in said closed position;

a biasing mechanism that causes said candy dispensing bin to be biased towards said closed position; and a support coupled to said candy dispensing body that is shaped so as to be capable of supporting said candy dispensing body in a standing position, said support being operatively coupled to said candy dispensing bin so that movement of said support relative to said candy dispensing body causes said candy dispensing bin to move from said closed position to said open position.

9. A candy dispensing character as defined in claim 5 wherein said support makes contact with said candy dispensing bin to force said candy dispensing bin from said closed position to said open position as said support is moved relative to said candy dispensing body when said candy dispensing body is in said standing position and when said candy dispensing body is pushed downwardly.

10. A candy dispensing character, comprising:

a candy dispensing body;

a hollow candy reservoir disposed in said candy dispensing body, said hollow candy reservoir sized to hold a plurality of candy pieces;

a movable candy dispensing bin attached to said candy dispensing body, said candy dispensing bin being movable between a closed position and an open position in which a portion of said candy dispensing bin extends outwardly from said candy dispensing body so that a piece of candy may be removed from said candy dispensing bin;

a biasing mechanism that causes said candy dispensing bin to be biased towards said closed position; and a support coupled to said candy dispensing body that is shaped so as to be capable of supporting said candy dispensing body in a standing position, said support being operatively coupled to said candy dispensing bin so that movement of said support relative to said candy dispensing body causes said candy dispensing bin to move from said closed position to said open position, wherein said support comprises a pair of legs and wherein said legs are joined together at a leg junction disposed at an upper end of each of said legs.

11. A candy dispensing character as defined in claim 5 additionally comprising a pair of arms that are movable relative to said candy dispensing body.

12. A candy dispensing character as defined in claim 5 wherein said candy dispensing body has a guide member shaped to guide said linear translation of said legs from said extended position to said retracted position.

13. A candy dispensing character, comprising:

a candy dispensing body having an elongate spherical shape;

a hollow candy reservoir disposed in said candy dispensing body, said hollow candy reservoir having a plurality of candy pieces disposed therein;

a pivotable candy dispensing bin attached to said candy dispensing body, said candy dispensing bin being pivotable between a closed position in which an outer portion of said candy dispensing bin is substantially flush with an outer portion of said candy dispensing body and an open position in which a portion of said candy dispensing bin extends outwardly from said candy dispensing body so that a piece of candy may be removed from said candy dispensing bin;

a spring having a first end attached to said candy dispensing bin and a second end attached to said candy dispensing body, said spring causing said candy dispensing bin to be spring-biased towards said closed position;

a pair of arms coupled to said dispensing body; and a pair of legs coupled to said candy dispensing body that are shaped so as to be capable of supporting said candy dispensing body in a standing position, an upper portion of each of said legs being positioned beneath said candy dispensing bin when said candy dispensing body is disposed in said standing position, said legs being linearly translatable relative to said candy dispensing body between a retracted position in which said legs extend into said candy dispensing body by a first distance and an extended position in which said legs extend into said candy dispensing body by a second distance less than said first distance so that, when said candy dispensing body is in said standing position and said candy dispensing body is pushed downwardly, said upper portions of said legs make contact with said bottom portion of said candy dispensing bin and force said candy dispensing bin from said closed position to said open position as said upper portions of said legs move from said extended position to said retracted position.

14. A candy dispensing character as defined in claim 13 wherein said legs are joined together at a leg junction disposed at an upper end of each of said legs.

15. A candy dispensing character as defined in claim 13 wherein each of said arms is movable relative to said candy dispensing body.

16. A candy dispensing character as defined in claim 13 wherein said candy dispensing body has a guide member shaped to guide said linear translation of said legs from said extended position to said retracted position.

* * * * *